United States Patent
Jones et al.

(10) Patent No.: US 12,067,513 B1
(45) Date of Patent: *Aug. 20, 2024

(54) SYSTEMS AND METHODS FOR EXPERIENCE-BASED DEVELOPMENT

(71) Applicant: United Services Automobile Assocation (USAA), San Antonio, TX (US)

(72) Inventors: Chalice Michelle-Burcham Jones, San Antonio, TX (US); Leslie Anne Dowling, San Antonio, TX (US); Jon Paul Vincent, San Antonio, TX (US); Carl Clinton Liebert, III, San Antonio, TX (US); Paige Spiers Gorman, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,780

(22) Filed: Nov. 30, 2021

Related U.S. Application Data

(63) Continuation of application No. 16/110,879, filed on Aug. 23, 2018, now Pat. No. 11,210,714.

(51) Int. Cl.
*G06Q 10/0631* (2023.01)
*G06Q 30/0601* (2023.01)

(52) U.S. Cl.
CPC ... *G06Q 10/06316* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 7,818,203 B1* | 10/2010 | Pearson | G06Q 30/02 705/7.29 |
| 10,031,652 B1 | 7/2018 | Yang et al. | |
| 2002/0173857 A1 | 11/2002 | Pabari et al. | |
| 2002/0184043 A1* | 12/2002 | Lavorgna, Jr. | G06F 16/972 707/E17.117 |
| 2006/0004596 A1 | 1/2006 | Caniglia et al. | |
| 2008/0028313 A1* | 1/2008 | Ebert | G06Q 30/02 715/780 |
| 2008/0140473 A1* | 6/2008 | Taylor | G06Q 10/06 705/7.29 |
| 2010/0251247 A1 | 9/2010 | Pedersen | |
| 2014/0100923 A1* | 4/2014 | Strezo | G06Q 10/067 705/7.11 |
| 2016/0219151 A1* | 7/2016 | McArdle | G06Q 10/10 |
| 2017/0140010 A1* | 5/2017 | Agarwal | G06Q 10/0633 |
| 2018/0307589 A1 | 10/2018 | Falkenberg et al. | |

FOREIGN PATENT DOCUMENTS

CA 2828984 A1 * 4/2014 ........... G06Q 10/067

OTHER PUBLICATIONS

Couper Mick P, Designing Effective Surveys, ISBN 9780511455513, Cambridge University Press, (selection) 2008 (Year: 2008).*

* cited by examiner

*Primary Examiner* — Octavian Rotaru
(74) *Attorney, Agent, or Firm* — Fletcher Yoder, P.C.

(57) ABSTRACT

Systems and methods for change management are provided. An electronic product and/or service provisioning system is tracked as a function of experiences. Changes are implemented at a process level, where two or more processes make up an experience.

20 Claims, 12 Drawing Sheets

SYSTEMS AND METHODS FOR EXPERIENCE-BASED DEVELOPMENT

CROSS REFERENCE TO RELATED APPLICATIONS

This application is a continuation of U.S. patent application Ser. No. 16/110,879, entitled "SYSTEMS AND METHODS FOR EXPERIENCE-BASED DEVELOPMENT," filed Aug. 23, 2018, which is hereby incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The provision of products and services to customers is becoming increasingly sophisticated. Whether provided via e-Commerce websites or more traditional means, such as telephone line transactions, increasingly complex systems are being utilized, exposing customers to increased functionality centered around product and service offerings.

Unfortunately, it is now recognized that the increasing complexity of these systems has provided new complexities in change management procedures. For example, Enterprise systems have many interdependencies, such that changes made for one system may impact another. Further, as these systems increase in functionality, ownership of the added functionality may oftentimes be unclear. This lack of ownership may result in development of features within these systems being reactive, triggered primarily based upon complaints, bugs, or other negative feedback.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The embodiments disclosed herein relate to systems and methods for change management driven based upon customer and employee experiences. In some embodiments, the change management may be further constrained by business deliverables. By driving change based upon experiences, many additional benefits may be observed over traditional business milestone-based change. For example, change may be customer and employee centric, resulting in focused change that solves/enhances product and service offerings to the customer as well as provides enhancements enabling better sustaining efforts by employees.

In the embodiments provided herein, change management software/services store change management information (e.g., the work completed and the work to be done) organizationally by experiences and processes. Experiences include one or more contacts between a customer and/or an employee with a provisioning system that provides products and/or services of a business. Processes are fundamental electronic functions that, when combined with other processes, form an experience. In other words, an experience is made of one or more processes.

The change management software/services may enable focused, accountable, and efficient change of the provisioning system, as will be discussed in more detail below. Further, the change management software/services may enable persistent change management that encourages an iteratively-changing change management roadmap that proactively defines and prioritizes change based upon customer and employee experiences with the provision system. By providing experience-based change management tools, computers are able to facilitate change management in new ways not available in conventional computer-implemented change management software. Instead of presenting schedule-focused functionality releases, the computer may track product development according to experiences, resulting in new and improved change management processes of the current computer systems.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
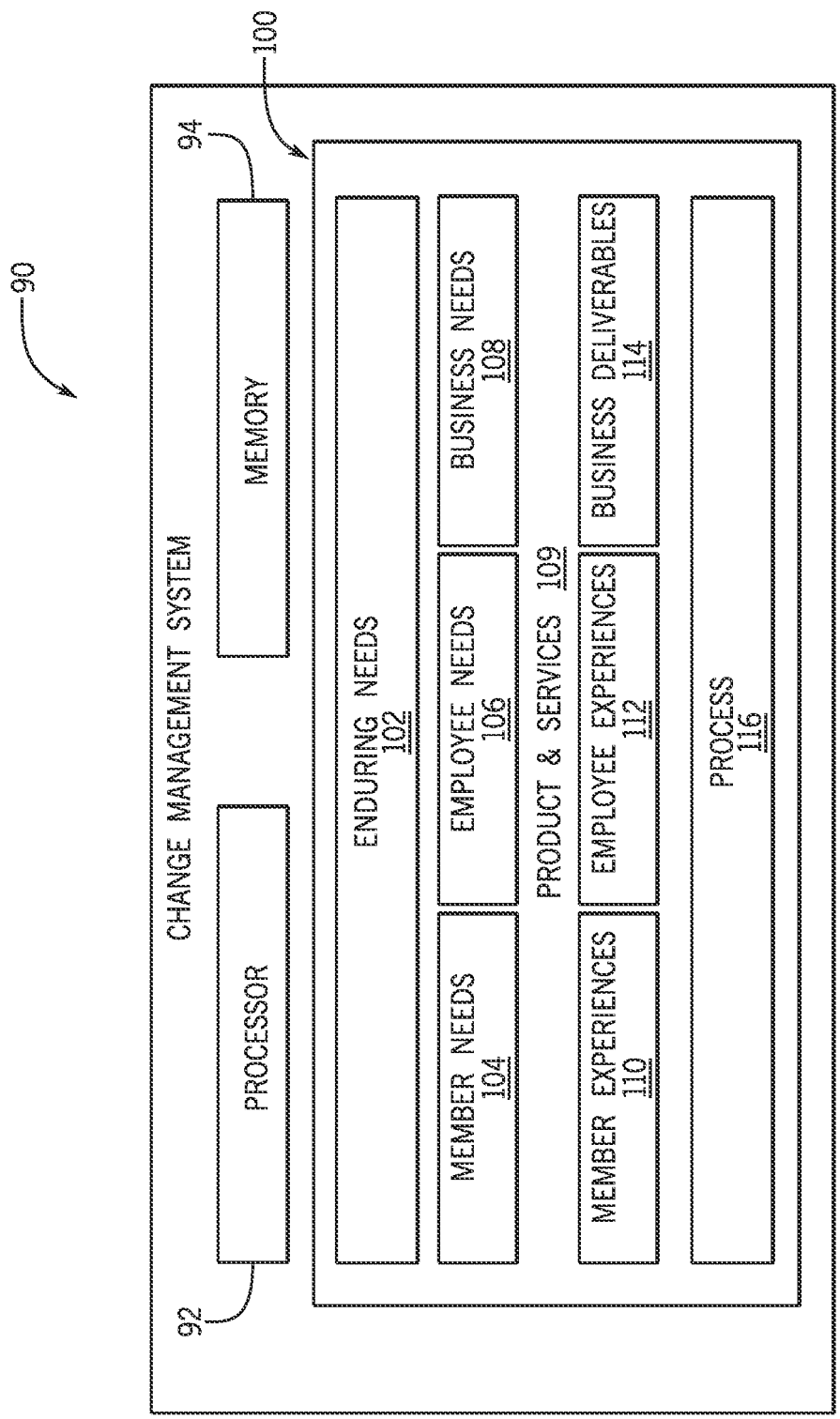
FIG. 1 is block diagram, illustrating an experience-based change taxonomy, in accordance with an embodiment.

By way of introduction to the present concepts and to provide context for the examples discussed herein, FIG. 1 is a block diagram of a change management system 90 that implements a taxonomy 100 that serves as the basis for the experience-based change management software/services discussed herein. The change management system includes at least one processor 92 and at least one tangible, non-transitory machine readable medium (e.g., memory 94). The memory 94 stores processor 92 implemented instructions that result in new change management operations, incorporating tracking using the taxonomy 100.

To understand the experience-based change management system, it may be beneficial to begin with a discussion of the underlying taxonomy 100 of the change management system 90. Starting first with enduring needs 102, these are the highest level of needs of a member (e.g., customer), employee, and/or business organization associated with the provisioning system providing the products and/or services offerings. For example, in an risk management context, an enduring need may be to obtain protection (e.g., medical protection) for a customer's family. An enduring need for an employee of the business might include empowerment to complete employee tasks. A business' enduring need might include maintaining budgetary constraints while obtaining new customers.

Under enduring needs 102 are one or more lower-level needs (e.g., member needs 104, employee needs 106, and business needs 108). These are lower-level needs, in that they enhance the enduring needs 102. For example, a member need 104 for efficient/time-managed enrollment of services may greatly enhance the enduring need 102 of obtaining protection for the member's family. Further, an employee need 106 for efficient data entry may greatly enhance the enduring need 102 of empowerment to complete employee tasks.

The enduring needs 102 and the lower-level needs (e.g., member needs 104, employee needs 106, and business needs 108) may be satisfied by the products and services 109. The products and services 109 may refer to the provisioning systems that provide the products and services. For example, a risk management services website that provides enrollment for services may be considered products and services 109, in the current context.

As mentioned above, members (e.g., customers) and/or employees may interact with the products and services 109, via experiences 110 and employee experiences 112. Further, business deliverables 114 are achieved via the products and services 109. For example, an experience 110, in a risk management context, may include enrolling in services. An employee experience 112 may include call center interaction with a user that is enrolling in services. Business deliverables 114 may include the addition of a customer for the products and services 109.

Experiences (e.g., experiences 110 and employee experiences 112) are made of processes 116. Processes 116 are sub-functions of an experience. However, processes 116 need not be exclusive to a particular experience. For example, an experience 110 that enables a user to pay their bills online using a credit card may include a common credit card processing process 116 with another experience 110 that allows the customer to pay their first service payment during an enrollment experience.

Figure 2:
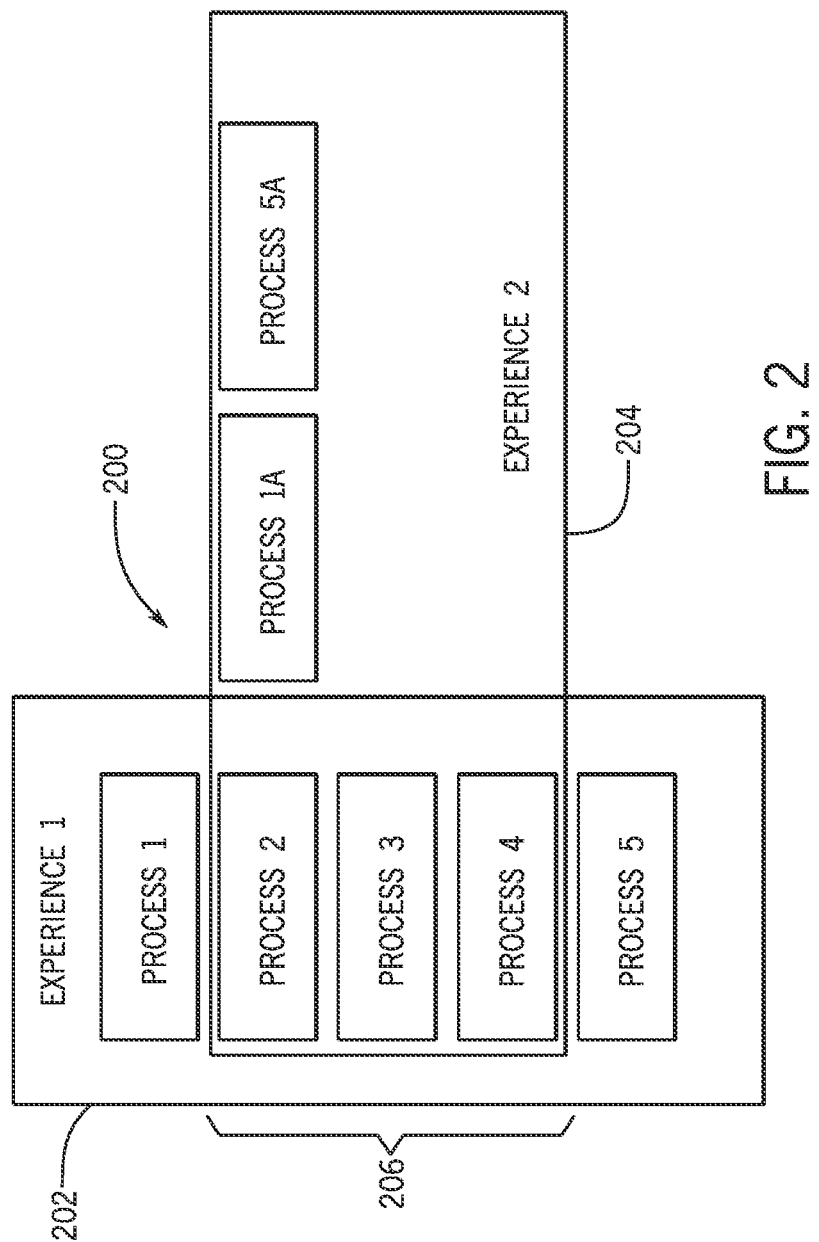
FIG. 2 is a block diagram, illustrating a relationship between experiences and processes, in accordance with an embodiment.

FIG. 2 is a block diagram, illustrating an example relationship 200 between experiences and processes of a computer product, in accordance with an embodiment. As illustrated, a first experience 202, "Experience 1", which may be an interaction with an electronic product and/or service provisioning system, is made up of Process 1, Process 2, Process 3, Process 4 and Process 5, which may be more granular computer functions that may be used across multiple experiences. A second process 204, "Experience 2", is made of up Process 1A, Process 2, Process 3, Process 4, and Process 5A. Accordingly, mutual processes 206 (e.g., Process 2, Process 3, Process 4) are shared between the first experience 202 and the second experience 204.

As may be appreciated from FIG. 2, modifications made for one experience may impact other experiences. For example, when one of the mutual processes 206 are changed for the first experience 202, the mutual process 206 that was changed will change for the second experience 204 as well. Accordingly, unintended changes may be erroneously applied to other experiences, when making changes for a particular experience. As will be discussed in more detail below, change impact tools may provide an indication of experience changes that may affect other experiences, such that unintended modifications are reduced, reducing bug introduction into the provisioning system. Accordingly, the present embodiments improve existing computer technology, by proactively solving a significant problem with computer software development. Specifically, the current embodiments provide easy and effective indications of processes that affect multiple experiences, reducing unanticipated computer code introduction consequences across complex computer systems.

Figure 3:
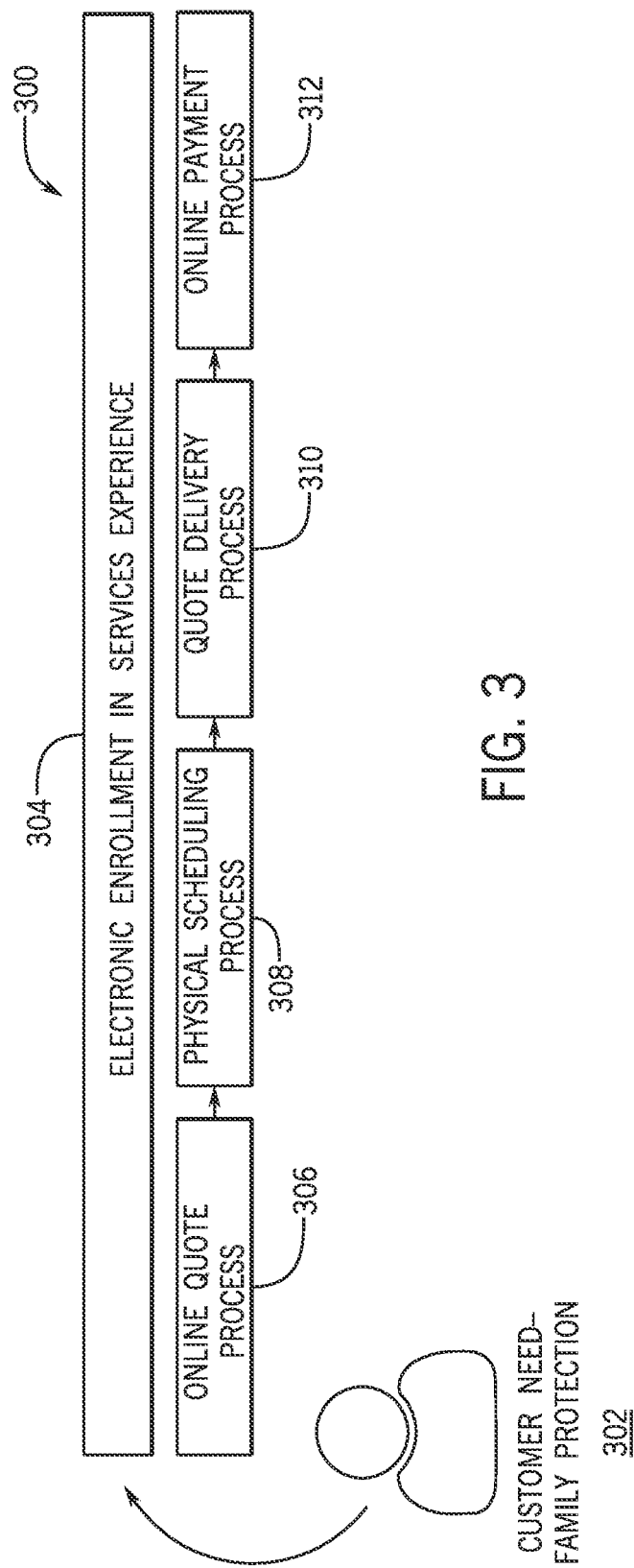
FIG. 3 is a block diagram, illustrating a risk management example of a source need, resulting in defined experience made up of various processes, in accordance with an embodiment.

FIG. 3 is a block diagram, illustrating a risk management example of a source need 302, resulting in defined experience (e.g., the Electronic Enrollment in Services Experience 304) made up of processes (Online Quote Process 306, Physical Scheduling Process 308, Quote Delivery Process 310, and Online Payment Process 312), in accordance with an embodiment. As illustrated, the processes 306, 308, 310, and 312 are sequentially performed to result in a successful provision of products and services that fulfill the customer need 302 of family protection. As will be discussed in more detail below, the experience-based change management software/services encourage proactive enhancement to the provision system, by improving customer and/or employee experiences with the provisioning system. For example, experience monitoring may provide an indication of improvements that may be introduced into one or more of the processes 306, 308, 310, and/or 312. An experience owner, charged with sustaining and improving the experience 304 may request/cause implementation of enhancements to the one or more of the processes 306, 308, 310, and/or 312, resulting in improvements to the customer's experience. This results in more efficient satisfaction of the customer need 302.

The granularity of experiences and processes 306, 308, 310, and/or 312 may be pre-defined. For example, experiences may be broken down until 5 or fewer processes make up the experience. Taking the Online Payment Process 312 as an example, if the Online Payment Process 312 could be broken down into 5 or fewer processes, the Online Payment Process 312 could be classified as a sub-experience of the experience 304, made up of the 5 or fewer processes. By using the proper level of granularity for experiences and processes, change modification risk may be reduced. For example, changes to a more granular process, may be less likely to negatively impact experiences made up of that more granular process than changes made to a less granular process.

Figure 4:
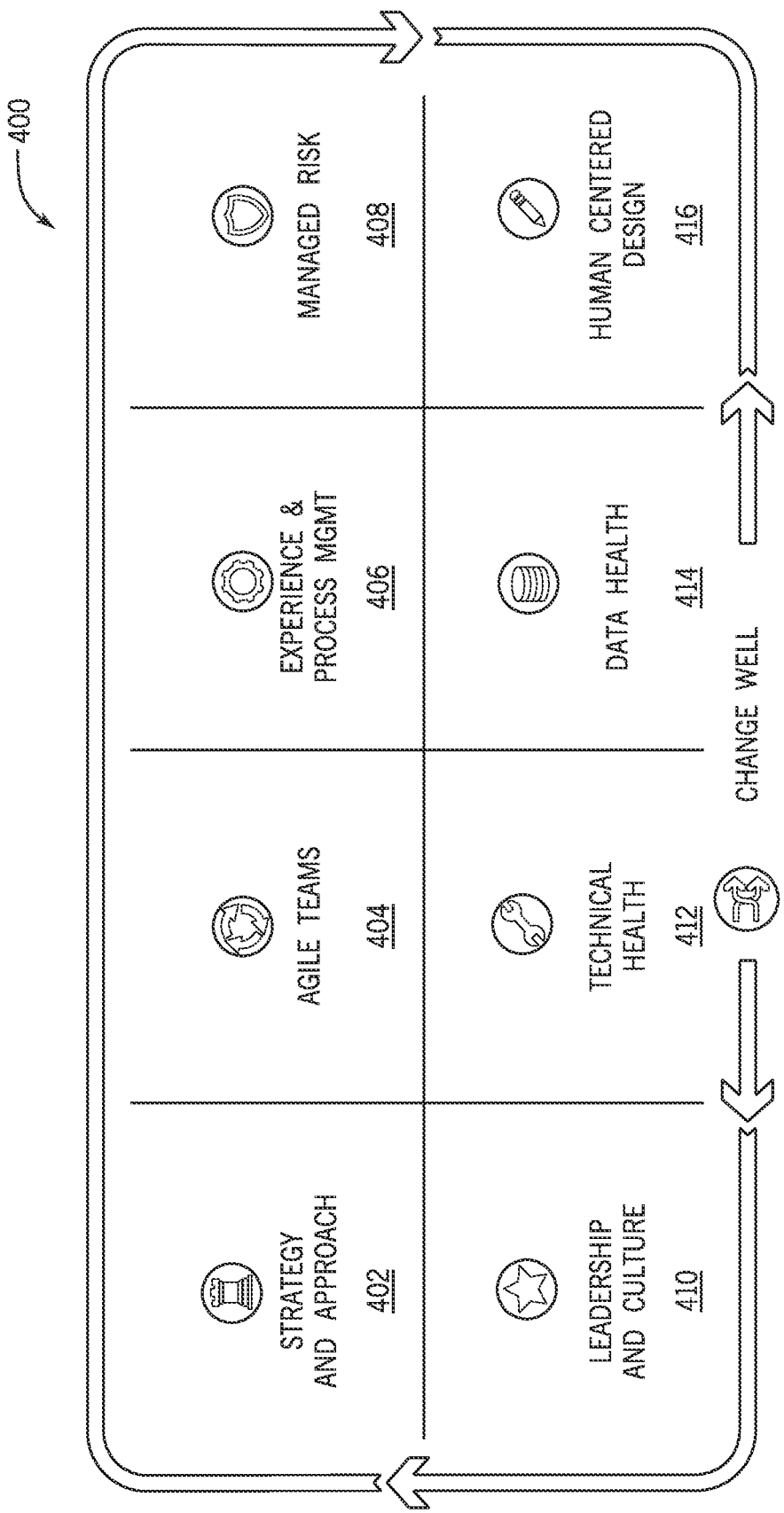
FIG. 4 is a block diagram, illustrating a change management execution framework, defined by experiences, in accordance with an embodiment.

FIG. 4 is a block diagram, illustrating a change management execution framework 400, defined by experiences, in accordance with an embodiment. As will become clear in the detailed description below, the framework 400 is facilitated by the change management software/systems to implement change in a simple, compliant, and reliable member and employee experience-focused manner. For example, graphical user interfaces (GUIs) or other electronic technology improvements of the experience-based change management system 90 are discussed herein to address each item of the framework 400.

In the framework 400, the strategy and approach 402 organizes work into experiences and processes, as discussed above. Persistent funding is provided to experiences, such that experience roadmaps may drive the change. Thus, iterative enhancements may be made to an experience, such that "once and done" changes that do not continually improve an experience are avoided. Further, because work is categorized by experiences and processes that make up experiences, work may be prioritized based upon priority of experiences, risk associated with a change to a process, or the like.

Agile Teams 404 may implement the changes to the experiences/processes. Agile Teams 404 may include cross-functional teams that iteratively adapt portions of the provisioning system to increasingly enhance experiences with the provisioning system over time.

The experience and process management component 406 of the framework 400 assigns clear ownership and accountability to experiences and processes. Breaking down ownership at these levels, encourages forward-looking change action vis simple, safe, repeatable, and sometimes automated processes. Experience Owners (EOs) are defined as owners of experiences and are provided a full view of mapped sub-processes of their owned experiences. As discussed above, the sub-processes are defined at a consistent granularity level, such that experiences are adequately broken down to reduce inadvertent changes to unrelated functionality. Thus, the current embodiments improve over existing computer that is currently available, by providing new levels of technical ownership to experiences within an electronic product and/or services provisioning system as well as enhanced tools for preemptively reducing unintended consequences of new computer code changes introduced into the electronic product and/or services provisioning system.

The managed risk component 408 provides layered lines of defense with a first line owning the risk and authentic risk controls prioritized. Under this component 408, there is a clear succession of responsibility for risk of an experience down to a process. Key risk indicators (KRIs) are tailored to changing needs of experiences and vigilant change anticipation is facilitated based upon the clear ownership and dynamic KRI definitions.

The leadership and culture component 410 of the framework 400 provides empowered and accountable teams that achieve outcomes and drive continuous improvement. Milestones deliver business outcomes for changing member needs. Further, experience teams achieve rapid wins and learning through rapid iterations of change. The experience teams are empowered and accountable for making change decisions for their assigned experiences and processes.

The technical health component 412 of the framework 400 prioritizes reduction of technical debt for experiences and increase of testing for experiences. This may be facilitated by automated testing and technical debt analysis for defined experiences.

Under the data health component 414, data methods promote insight-driven decisions and measure change effectiveness. Customer tracking, along with other business and/or process metrics may be used to determine change effectiveness metrics. Embedded feedback loops are used to improve change models.

Under the human centered design component 416, the change design is centered around members and employees. A minimum viable product may be defined based upon customer needs and/or minimum experience standards for a given experience.

As mentioned above, the framework 400, when implemented properly, ensures delivery of simple, compliant, member and employee experience-focused development that can dynamically shift based upon new customer, employee, and/or business needs. To facilitate proper implementation of this framework 400, the change management software/services may provide a set of core experience-based functionalities, which are detailed below.

The Experience-Based Change Management Software/Services

Figure 5:
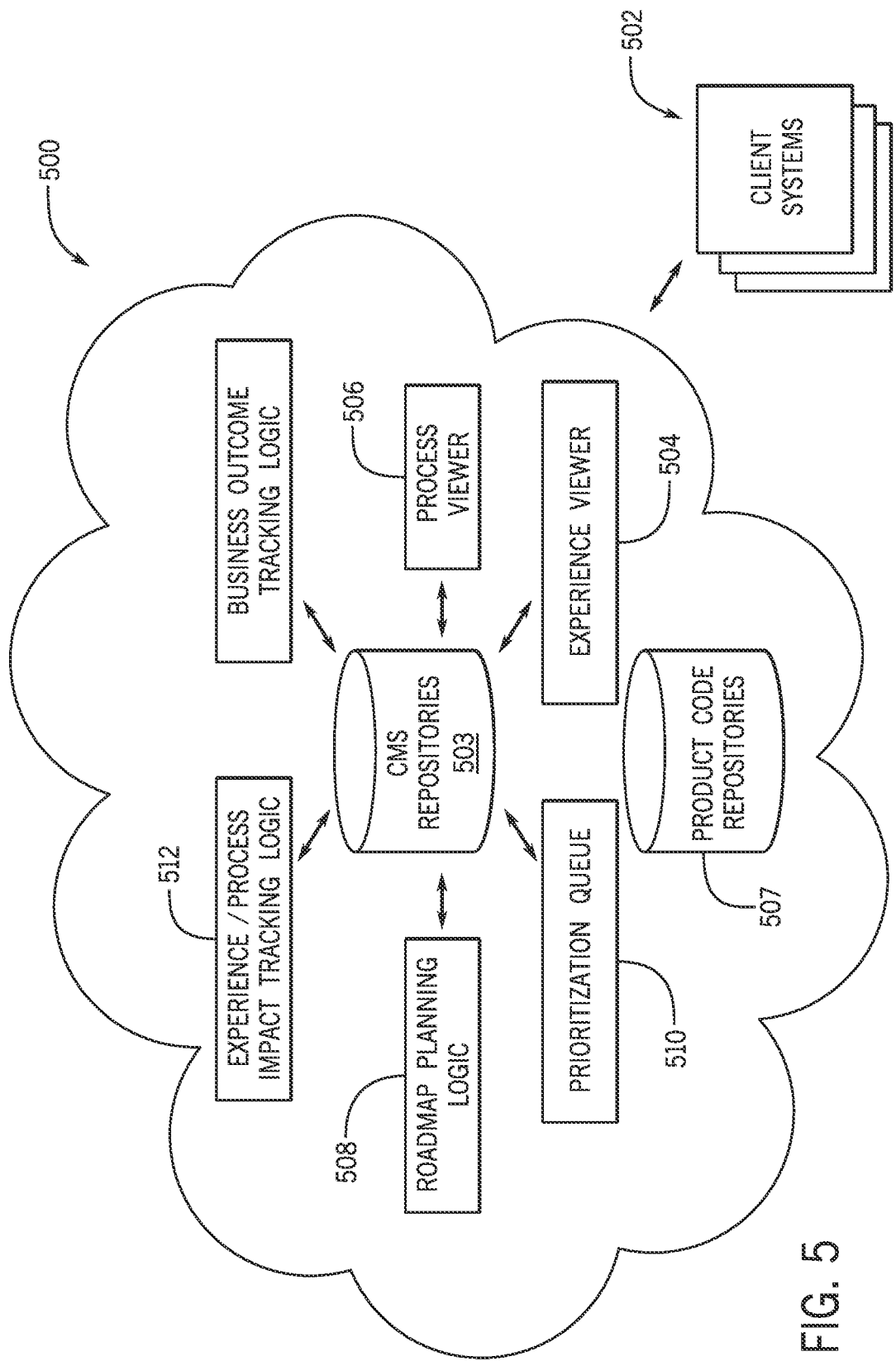
FIG. 5 is a block diagram, illustrating an experience-based change management system, in accordance with an embodiment.

FIG. 5 is a block diagram, illustrating an experience-based change management system (CMS) 500, in accordance with an embodiment. The CMS 500 may be accessed by client systems 502, such as development computers of the Agile Teams 404 discussed in FIG. 4. As mentioned above, the CMS 500 facilitates efficient and effective implementation of the framework 400 of FIG. 4, by providing particular tools that encourage experience-based change management. Data created and edited by the CMS 500 may be stored in the CMS repositories 503. For example, the CMS repositories 503 may include relational database tables that store data associations between various data provided by the CMS 500. For example, as discussed below, certain data is associated with other data via the CMS 500 tools. For example, processes make up experiences and, thus, the processes making up a particular experience may be associated with the particular experience. The associations discussed herein may be facilitated by relationships formed in the CMS repositories 503.

Figure 6:
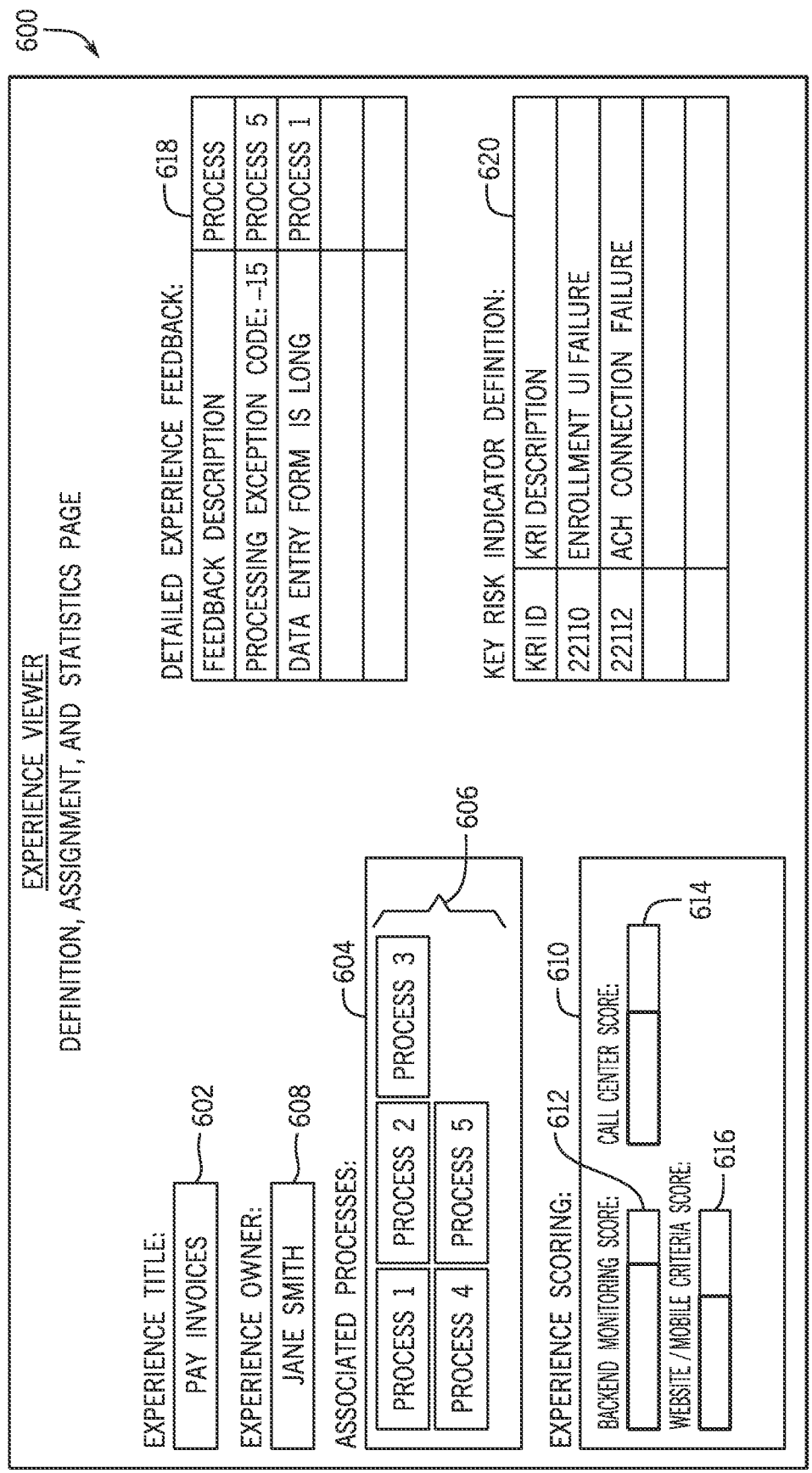
FIG. 6 is a schematic diagram, illustrating an example of an Experience Definition, Assignment and Statistics graphical user interface (GUI) of the experience-based change management system, in accordance with an embodiment.

As will be discussed in more detail below, the CMS 500 includes an experience viewer 504. The experience viewer 504 enables generation and definition of new product experiences, assignment of the experiences, as well as scoring and other statistics of the experiences. FIG. 6 is a schematic diagram, illustrating an example of an Experience Definition, Assignment and Statistics graphical user interface (GUI) 600 of the CMS 500, in accordance with an embodiment.

In the Experience Definition, Assignment and Statistics GUI 600, an experience is generated, with a title (e.g., inputted into a title field 602). In the current example, the experience title is "Pay Invoices" and is associated with a customer's experience with paying invoices via the business' e-commerce site.

As previously mentioned, experiences are made up of two or more processes. Accordingly, an associated process field 604 may serve to associate processes with the currently viewed experience. Thus, in the current example, Process 1, Process 2, Process 3, Process 4, and Process 5 are associated with the Pay Invoices experience, as illustrated by the process icons 606. In some embodiments, the process icons 606 may be selectable, resulting in a process viewer GUI associated with the selected process icon 606. This will be discussed in more detail with regard to FIG. 7.

As mentioned above, an experience owner is assigned to each experience, enabling clear accountability for each experience. The experience owner field 608 selectively enables assignment of an experience owner for the currently viewed experience. For example, here, the experience owner is assigned as Jane Smith. Accordingly, Jane Smith is the owner of the overall invoice payment experience for all customers. By providing an experience owner, work accountability is experience-centric, resulting in maturation of an experience rather than "once and done" development that does not reach its full potential, due to lack of accountability at the experience level.

To ensure maturation of an experience, it may be useful to understand the current statistics regarding the experience. As will be discussed in more detail below, with regard to FIG. 11, experience feedback may be sourced from a variety of sources. This feedback may be provided in the Experience Definition, Assignment and Statistics GUI 600. Below are examples of a set of scores for the experience and how the scores are calculated. This discussion is not intended to limit scoring to the discussed scoring techniques. Indeed, experience scoring may be dynamically changing as new analytical data becomes available.

In the current embodiment of the Experience Definition, Assignment and Statistics GUI 600, an experience scoring section 610 is present, which provides a variety of scoring metrics that may be used to define experience enhancements that may be implemented in subsequent change iterations for the experience. For example, in the current embodiment, a backend score 612, a call center score 614, and a website/mobile criteria score 616 may be presented, based upon how well predefined criteria are met, as observed by backend monitoring, call center operators, and website/mobile app monitoring, respectively. For example, backend monitoring may specify timing criteria for communications between backend systems associated with the provision system. The criteria may set minimum thresholds, as well as optimal thresholds. The backend monitoring score 612 may be calculated, at least in part, based upon an interpolation of real-world observed timings with the minimum and optimal thresholds. In the current example, the timings may be closer to the optimal thresholds, resulting in a score over 50%. By using the backend scoring 612, existing computer technology is improved, as the change management system 90, itself, may become self-aware of experience maturation without human subjectivity, instead relying on backend statistics to determine an experience's progress towards maturity. This may result in decreased human subjectivity in prioritizing change, resulting in less subjective prioritization of future tasks.

The call center score 614 may be based upon call center feedback. For example, the call center may observe that a number of users call in for call center supported payment of invoices, because of difficulties with the experience. The call center may generate electronic tickets or other indications of these observations, which may impact the call center score 614. Relatively few and/or below average call center calls for a particular experience may indicate a maturing experience, and may be used to increase the call center score 614. By using the call center score 614, existing computer technology is improved, as the change management system 90, itself, may become self-aware of experience maturation without human subjectivity, instead relying on call center statistics to determine an experience's progress towards maturity. This may result in decreased human subjectivity in prioritizing change, resulting in less subjective prioritization of future tasks.

The website/mobile criteria score 616 may be based upon observations from a website and/or mobile app that is providing the experience. For example, web analytics, such as Omniture® tracking, may be used to identify circular pathways of navigation on the website and/or mobile app. This may indicate unclear navigation prompts within the website and/or mobile app that may reduce the website/mobile criteria score 616. Further, the web analytics may track usage of electronic help files. When frequently used, the electronic help files may indicate improvement opportunities for the website and/or mobile app and, thus, results in a decreased website/mobile criteria score 616. By using the website/mobile criteria score 616, existing computer technology is improved, as the change management system 90, itself, may become self-aware of experience maturation without human subjectivity, instead relying on website/mobile metrics to determine an experience's progress towards maturity. This may result in decreased human subjectivity in prioritizing change, resulting in less subjective prioritization of future tasks.

The Experience Definition, Assignment and Statistics GUI 600 may also include a detailed experience feedback section 618, which may provide detailed feedback that includes a feedback description and a particular process of the experience that relates to the feedback. Here, for example, a processing exception code of −15 has been observed during the Pay Invoices experience. This processing exception code has been attributed to Process 5. In some embodiments, this attribution may be automatically performed by the CMS 500, when exception types for a particular process are handed and/or pre-disclosed. In some embodiments, this attribution may be manually entered by a user, for example, via a GUI field of the detailed experience feedback section 618. Here, the detailed experience feedback entry that indicates that the data entry form is long is associated with process 1, which provides the data entry prompts for the customer during an enrollment.

The Experience Definition, Assignment and Statistics GUI 600 may also provide a list of key risk indicators (KRIs) associated with the currently viewed experience. For example, in the current embodiment, two KRIs are presented in the Key Risk Indicator Definition section 620. KRI ID 22110 is associated with an Enrollment UI Failure key risk indicator and KRI ID 22112 is associated with an Automated Clearing House (ACH) Connection Failure key risk indicator.

Figure 7:
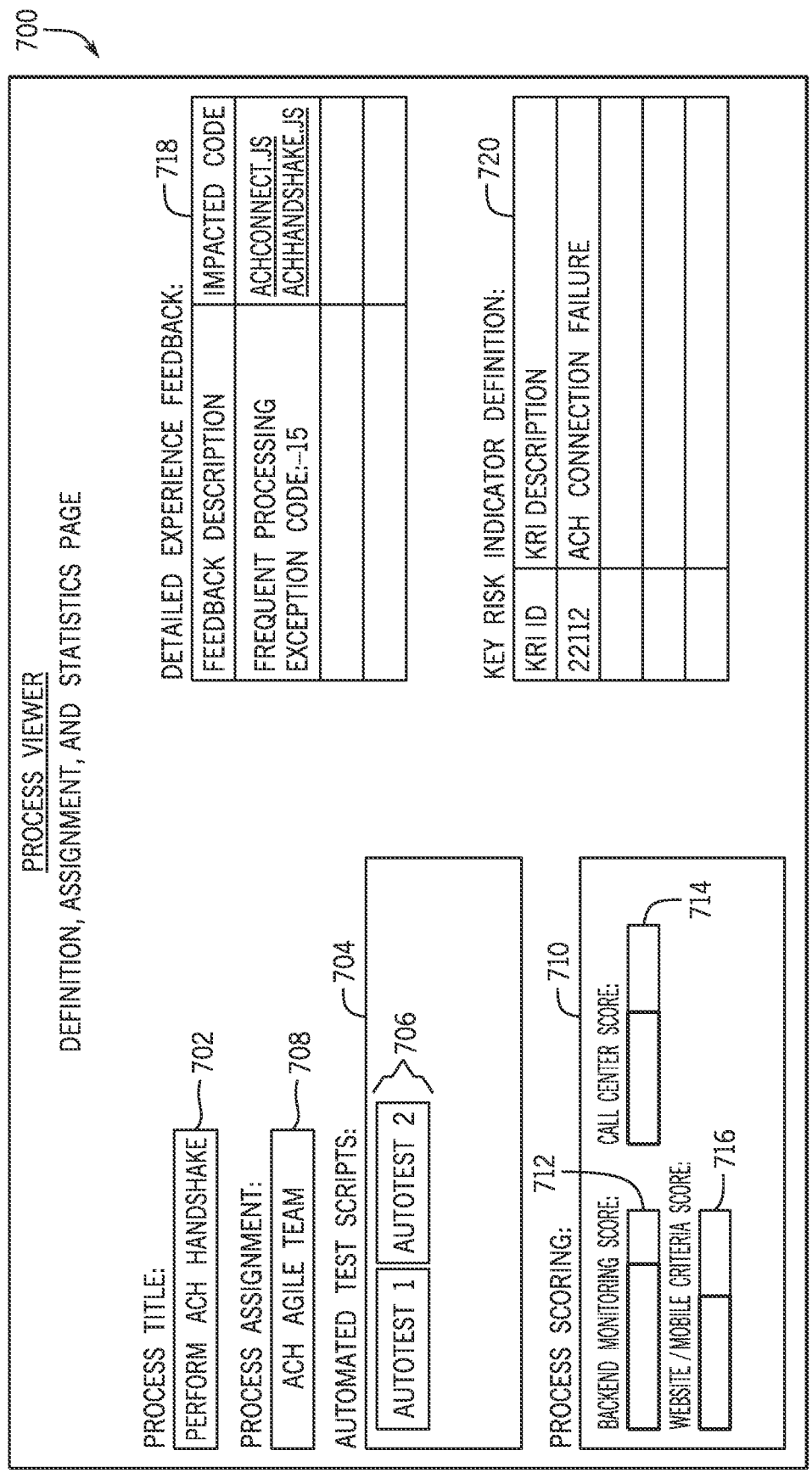
FIG. 7 is a schematic diagram, illustrating an example of a Process Definition, Assignment, and Statistics GUI of the experience-based change management system, in accordance with an embodiment.

Returning to FIG. 5, the CMS 500 also includes a process viewer 506, which renders characteristics and editable features associated with a selected process. The process viewer 506 enables process definition and assignment, and provides statistics related to the process. FIG. 7 is a schematic diagram, illustrating an example of a Process Definition, Assignment, and Statistics GUI 700 generated by the process viewer 506 of the CMS 500, in accordance with an embodiment.

In the Process Definition, Assignment, and Statistics GUI 700, a process is defined and titled (e.g., by inputting a title into a title field 702). In the current example, the process title is "Perform ACH Handshake" and is associated with initiating a session with an Automated Clearing House (ACH).

As discussed herein, automation testing may be performed on processes, as processes typically may be stable and highly utilized by a number of experiences. Accordingly, an associated automated testing scripts section 704 may serve to associate processes with relevant automation test scripts. Thus, in the current example, the "Perform ACH Handshake" process is associated with automation test scripts "AutoTest 1" and "AutoTest 2," as illustrated by the test script icons 706. In some embodiments, the test script icons 706 may be selectable, resulting in automatic opening and/or execution of the test script via an automation test script tool.

As mentioned above, a team may be assigned to each process, enabling clear accountability for each process. The process assignment field 708 selectively enables assignment of a team for the currently viewed process. For example, here, the process is assigned to the ACH Agile Team. Accordingly, this team is accountable for changes made to this process. By providing an assignment of a team to a process, work accountability is clear, resulting in maturation of processes by a persistent team, rather than "once and done" development that does not reach its full potential, due to lack of accountability.

To ensure maturation of a process (and ultimately the experiences that use the process), it may be useful to understand the current statistics regarding the process. As discussed herein, process feedback may be sourced from a variety of sources. This feedback may be provided in the Process Definition, Assignment, and Statistics GUI 700. Below are examples of a set of scores for the process and how the scores are calculated. This discussion is not intended to limit scoring to the discussed scoring techniques. Indeed, process scoring may be dynamically changing as new analytical data becomes available.

In the current embodiment of the Process Definition, Assignment, and Statistics GUI 700, a process scoring section 710 is present, which provides a variety of scoring metrics that may be used to define process enhancements that may be implemented in subsequent change iterations for the process. For example, in the current embodiment, a backend score 712, a call center score 714, and a website/mobile criteria score 716 may be presented, based upon how well predefined criteria are met, as observed by backend monitoring, call center operators, and website/mobile app monitoring, respectively. For example, backend monitoring may specify timing criteria for communications between backend systems associated with the provision system. The criteria may set minimum thresholds, as well as optimal thresholds. The backend monitoring score 712 may be calculated, at least in part, based upon an interpolation of real-world observed timings with the minimum and optimal thresholds. In the current example, the timings may be closer to the optimal thresholds, resulting in a score over 50%.

The call center score 714 may be based upon call center feedback. For example, the call center may observe that a number of users call in for call center supported payment of invoices, because of difficulties with the process. The call center may generate electronic tickets or other indications of these observations, which may impact the call center score 714. Relatively few and/or below average call center calls for a particular process may indicate a maturing process, and may be used to increase the call center score 714.

The website/mobile criteria score 716 may be based upon observations from a website and/or mobile app that is providing the process. For example, errors observed during execution of a process may be recorded and used in the process scoring.

In some embodiments, the Process Definition, Assignment, and Statistics GUI 700 may also include a detailed process feedback section 718, which may provide detailed feedback that includes a feedback description and particular code that relates to the feedback. Here, for example, a processing exception code of −15 has been observed during the "Perform ACH Handshake" process. Links to files ACHConnect.js and ACHHandshake.js are provided, for ease of development access to the relevant code associated with the process. For example, the links may access code to be changes in the product code repositories 507 of FIG. 5. The product code repositories 507 may store the provision system code along with development versions of the code to be implemented in subsequent change management iterations.

The Process Definition, Assignment, and Statistics GUI 700 may also provide a list of key risk indicators (KRIs) associated with the currently viewed process. For example, in the current embodiment, one KRI is presented in the Key Risk Indicator Definition section 720. KRI ID 22112 is associated with an Automated Clearing House (ACH) Connection Failure key risk indicator.

Figure 8:
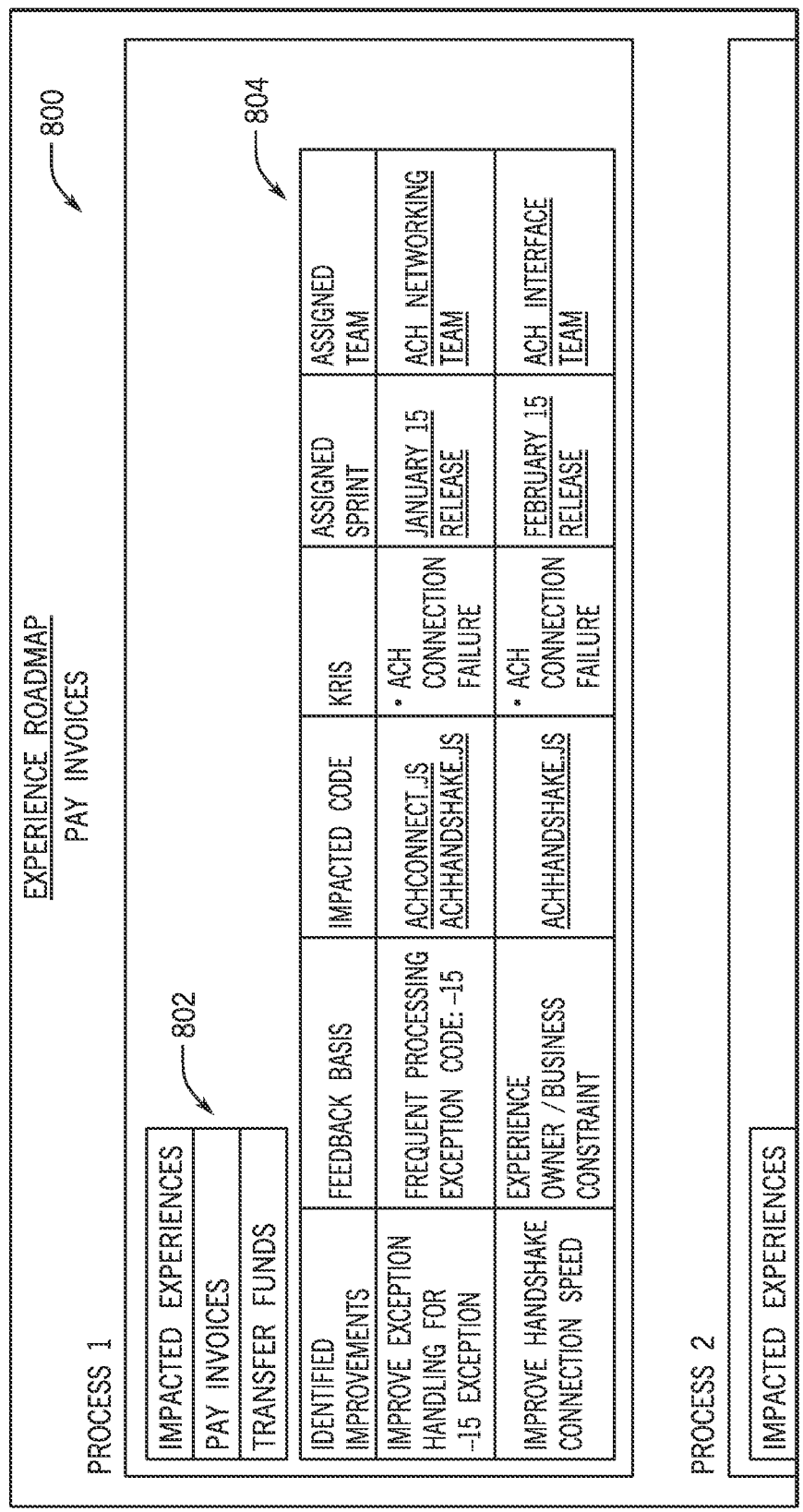
FIG. 8 is a schematic diagram, illustrating an example of an Experience Roadmap GUI of the experience-based change management system, in accordance with an embodiment.

Returning to FIG. 5, the CMS 500 also includes roadmap planning logic 508. The roadmap planning logic 508 facilitates future change planning for a given experience. FIG. 8 is a schematic diagram, illustrating an example of an Experience Roadmap GUI 800 generated by the roadmap planning logic 508 of the CMS 500, in accordance with an embodiment.

The Experience Roadmap GUI 800 provides a breakdown of processes associated with an experience. The breakdown equips a change manager to efficiently understand upcoming changes, improvements, risks, and the like.

Under each process, a list 802 of impacted experiences that are impacted by changes to the process is shown. For example, in the illustrated embodiment, the "Pay Invoices" and "Transfer Funds" experiences are impacted by changes to "Process 1."

Further, under each process, a list 804 of improvements to be introduced for the currently viewed process is provided. In the current embodiment, an identified improvement is associated with a feedback basis (e.g., a particular piece of feedback that was used to identify the improvement), particular impacted code (e.g., links to code stored in the product code repositories 507 of FIG. 5), KRIs associated with the improvement, assigned change iterations (e.g., sprints) that the improvements are planned to be implemented in, and a team assigned to implement the improvement. In the illustrated embodiment, an improvement is planned for the Exception Code: −15 that is discussed above. As illustrated, the feedback basis is a frequent occurrence of this code during execution of Process 1. The improvement is scheduled for implementation in the January 15 release and is assigned the ACH Networking Team. Additionally, a second improvement for improving handshake connection speed was also identified. The feedback basis for this improvement is an experience owner/business constraint. In other words, here, the experience owner or business counterparts identified an improvement to be implemented. This change is scheduled for the February 15 release and changes ACHHandshake.js. The change is assigned to the ACH Interface Team.

Figure 9:
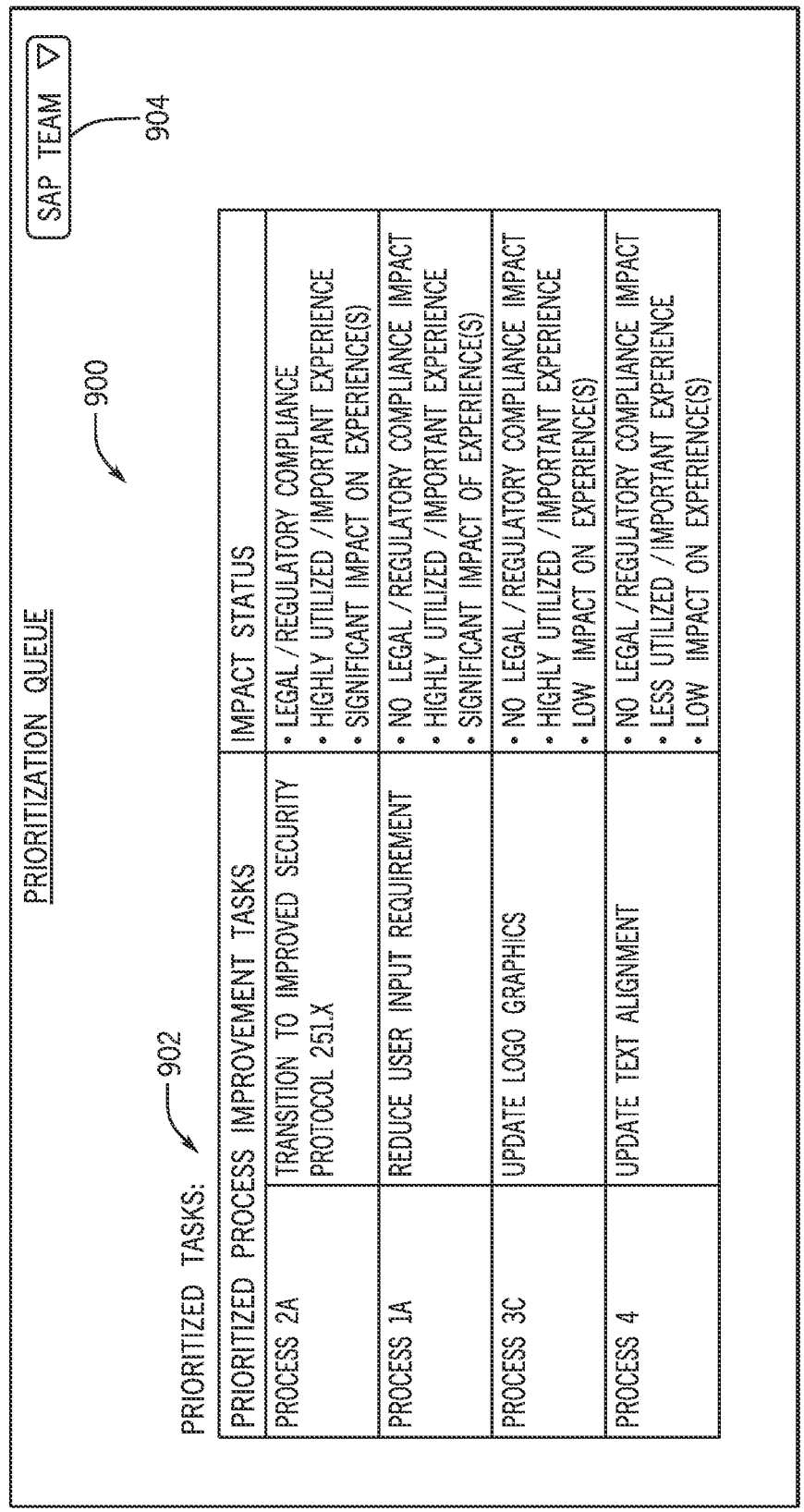
FIG. 9 is a schematic diagram, illustrating an example of a Prioritization Queue GUI of the experience-based change management system, in accordance with an embodiment.

Returning to FIG. 5, the CMS 500 also includes a prioritization queue 510. The prioritization queue 510 prioritizes changes based upon certain scoring criteria, such as: regulatory/legal compliance impact, a level of impact to experiences, a priority of the experiences that are impacted by the change, and the like. FIG. 9 is a schematic diagram, illustrating an example of a Prioritization Queue GUI 900 generated by the prioritization queue 510 of the CMS 500, in accordance with an embodiment. Prioritization of tasks may be implemented in a variety of different ways. In the current embodiment, prioritization takes into account several factors, including:

1) Whether the task affects legal/regulatory compliance,
2) Whether the task involves a highly utilized or otherwise important experience,
3) The level of impact on experiences.

Using these factors, the change management system 90 may prioritize tasks for a particular team, resulting in increased development efficiencies facilitated by the change management system 90. For example, in the current embodiment, the prioritization queue GUI 900 is illustrating a list 902 of prioritized tasks for a selected team 904 (e.g., the SAP team). Task that affect legal and/or regulatory compliance may be prioritized with the highest importance. Tasks that involve highly utilized or otherwise important experiences may be prioritized second. Tasks with a high level of impact on experiences may be prioritized third. Further, combinations of these factors may be used to prioritize these tasks. For example, tasks that have a legal/regulatory compliance impact and involve highly utilized or otherwise important experiences may be prioritized over tasks that have a legal/regulatory compliance impact but do not involve highly utilized or otherwise important experiences.

In the depicted example, the task associated with Process 2A is the top priority, as it is the only task with legal/regulatory compliance implementations. The task associated with Process 1A is prioritized next, as it is a process associated with a highly utilized or otherwise important experience and has a significant impact on experiences. The task associated with Process 3C is prioritized under Process 1A, because, while it does impact highly utilized or otherwise important experiences, it has a low impact on these experiences. Finally, the task associated with Process 4 is prioritized after the other tasks, as it does not have a legal or regulatory compliance impact, it only affects less utilized or less important experiences, and has a low impact on these experiences.

Figure 10:
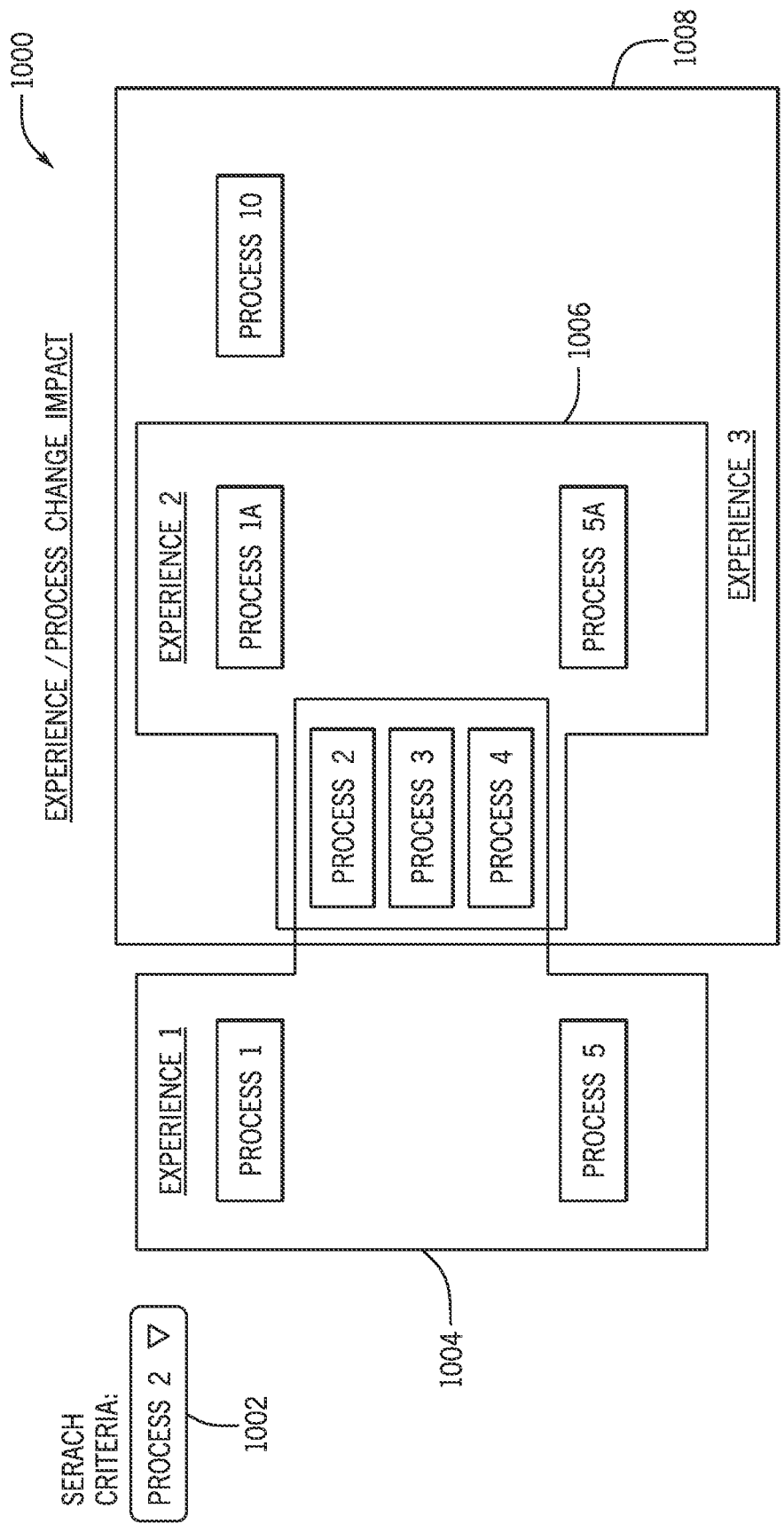
FIG. 10 is a schematic diagram, illustrating an example of a Change Impact GUI of the experience-based change management system, in accordance with an embodiment.

Returning to FIG. 5, the CMS 500 also includes a Graphical Experience/Process Impact Tracking tool 512. FIG. 10 is a schematic diagram, illustrating an example of a Change Impact GUI 1000 of the experience-based change management system, in accordance with an embodiment. The Change Impact GUI 1000 may present a graphical indication of change impact for modifications to processes and/or experiences. For example, overlapping indicia may be provided to illustrate interdependencies between processes and experiences. Thus, a developer may quickly glance at the Change Impact GUI 1000 to understand an impact of changing a process or experience. In some embodiments, the Change Impact GUI 1000 may filter overlapping indicia based upon a filter condition. For example, search criteria 1002 is provided in the current embodiment, which selectively allows a user to specify a particular process or experience of interest. Here, because the user is interested in changing Process 2, the Process 2 selection is selected for the search criteria 1002. Based upon this selection, the Graphical Experience/Process Impact Tracking tool 512 may render an indication of each of the impacted experiences and the processes that make up these experiences.

Here, a graphical indication 1004 of Experience 1 is provided, as Experience 1 includes Process 2 (along with Process 1, Process 3, Process 4, and Process 5). Additionally, a graphical indication 1006 of Experience 2 is provided, as Experience 2 includes Process 2 (along with Process 1A, Process 3, Process 4, and Process 5A). A graphical indication 1008 of Experience 3 is also provided, as Experience 3 includes Experience 2 (which includes Process 2) and also includes Process 10. As may be appreciated, the Change Impact GUI 1000 provides a very efficient graphical user interface that allows change managers and developers to quickly and effortlessly identify impacts for proposed changes to a process or experience. For example, by using the graphical indicators 1004, 1006, and 1008, it is easy to see that modifications to Process 2, Process 3, or Process 4 will affect Experience 1, Experience 2, and Experience 3. Further, modifying any of Experience 2 will affect Experience 3. Modifying Process 10 will only impact Experience 3, modifying Process 1 or Process 5 will only impact Experience 1, and modifying Process 1A or Process 5A will only impact Experience 2.

Experience Feedback

Figure 11:
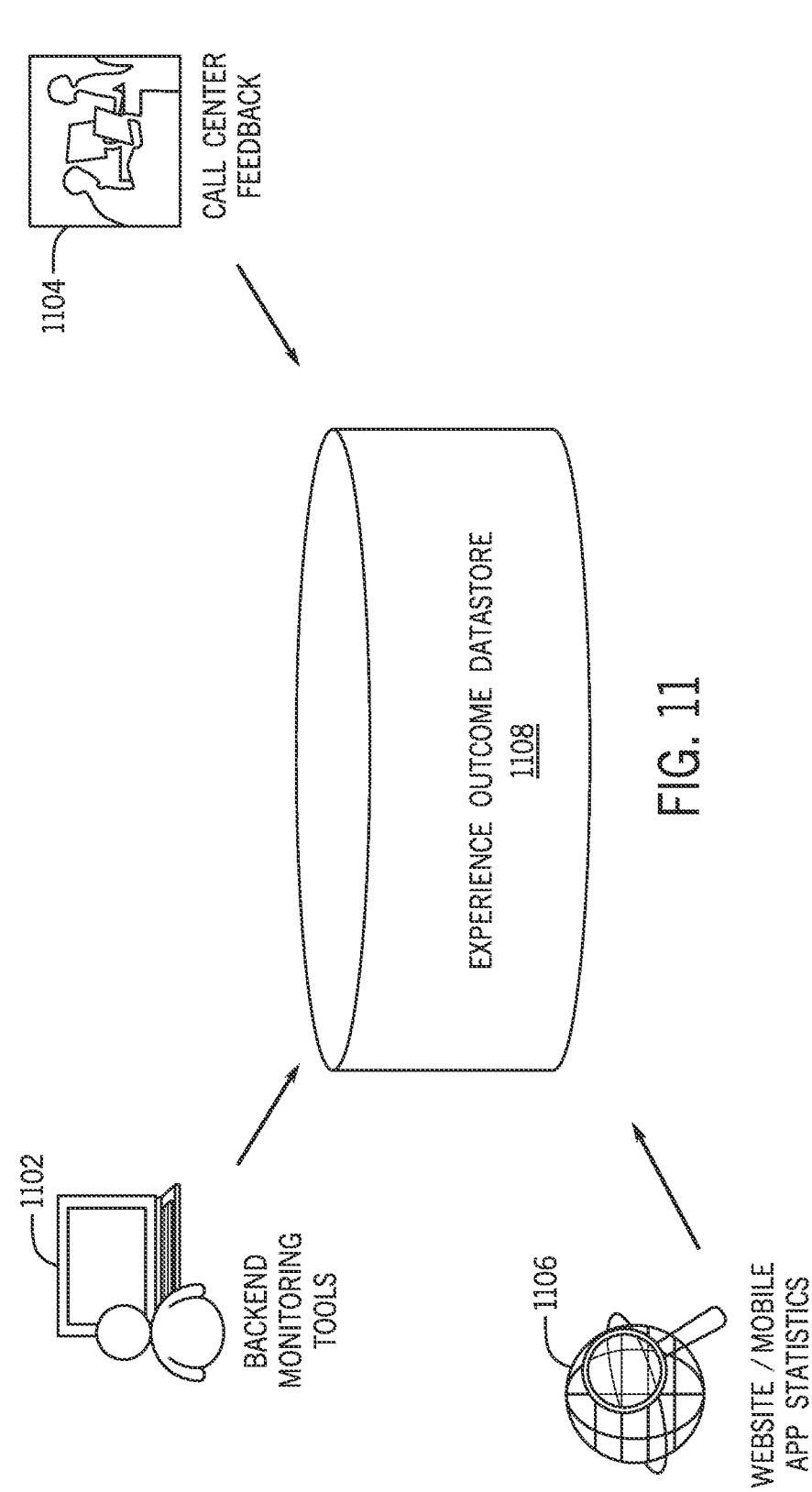
FIG. 11 is a schematic diagram, illustrating sources of Experience Outcome data, in accordance with an embodiment.

As previously discussed, experience outcomes may be monitored to measure the effectiveness of changes to experiences. FIG. 11 is a schematic diagram, illustrating a system 1100 for obtaining Experience Outcome Data, in accordance with an embodiment. This Experience Outcome Data may facilitate maturation of experiences (e.g., by facilitating an experience roadmap), as discussed above.

The system 1100 includes multiple sources of analytical data that may provide an indication of success or failure of an experience. For example, in the current embodiment, backend monitoring tools 1102, call center feedback 1104, and website/mobile app statistics 1106 serve as sources of the Experience Outcome Data.

The backend monitoring tools 1102 may specify measurement values of the backend computer systems useful for measuring success of an experience. For example, consumed processing power, network bandwidth utilization, a number of open sessions, electronic communications timings, and the like may be monitored. As discussed above, this monitored data may be analyzed to generate a backend score, indicating how well the experience is implemented from a backend data perspective. By using this backend score, existing computer technology is improved, as the change management system 90, itself, may become self-aware of experience maturation without human subjectivity, instead relying on backend statistics to determine an experience's progress towards maturity. This may result in decreased human subjectivity in prioritizing change, resulting in less subjective prioritization of future tasks.

As mentioned above, call center feedback 1104 may also be useful in determining an effectiveness of an experience. Accordingly, call center logs, characterizations, and service tickets may be collected as Experience Outcome data. For example, as discussed above, the call center may observe that a number of users call in for call center supported payment of invoices, because of difficulties with the experience. This information is helpful in determining improvements to the experience.

The website/mobile app statistics 1106 may also be accumulated as Experience Outcome Data. Code within the website/mobile app may be used to send analytics data to a monitoring service that may provide analytics regarding website/mobile app usage. For example, web analytics, such as Omniture® tracking, may be used to identify how a user interacts with a website/mobile app. This information may provide very useful insight into the successes and failures of an experience.

The Experience Outcome Data may be compiled and stored in an Experience Outcome Datastore 1108. As mentioned above, the Experience Outcome Data may be used to score an experience's success and/or failures. Theses scores may help Experience Owners to identify which of their owned experiences should be prioritized.

Automated Experience Testing

Figure 12:
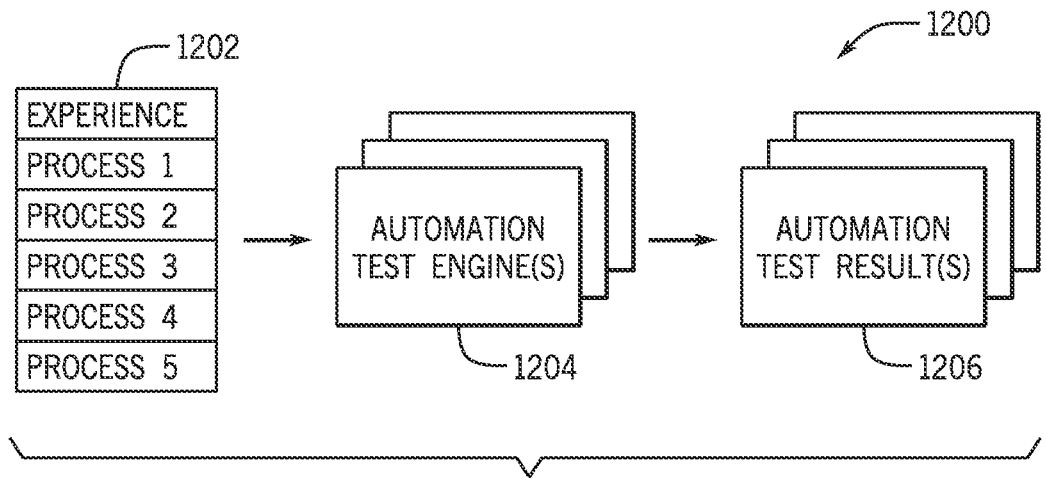
FIG. 12 is a schematic diagram, illustrating automated testing based upon received experience information, in accordance with an embodiment.
Figure 13:
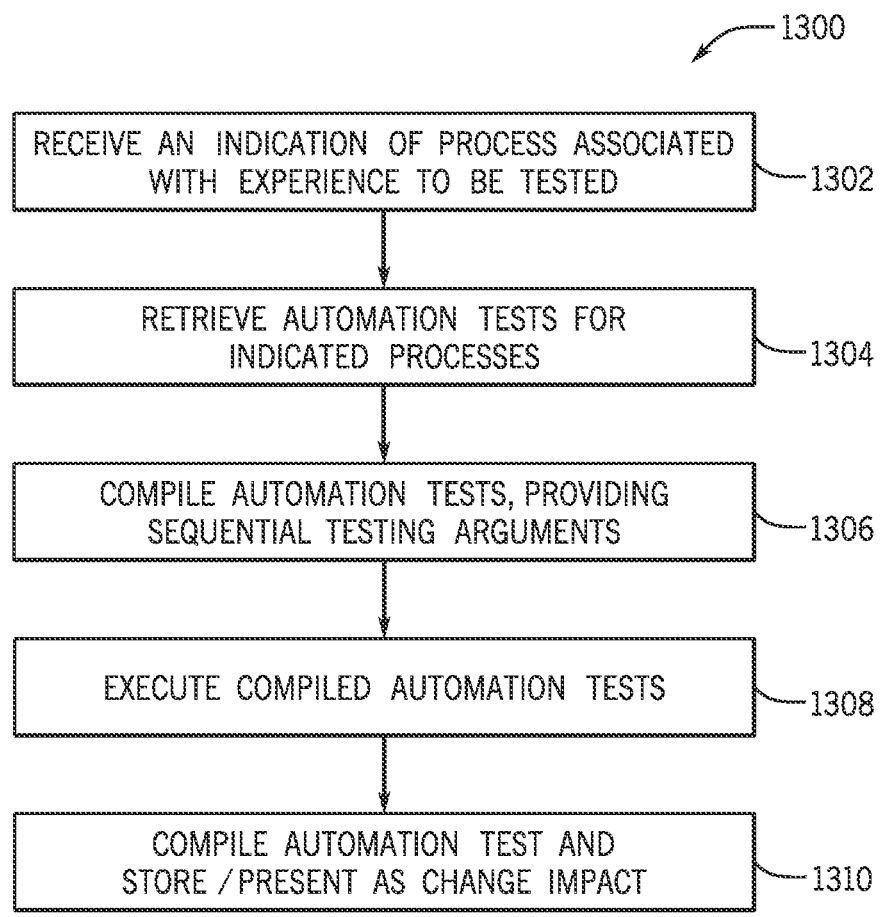
FIG. 13 is a flowchart, illustrating a process for performing automated testing for an experience, in accordance with an embodiment.

FIG. 12 is a schematic diagram, illustrating automated testing 1200 based upon received experience information, in accordance with an embodiment. FIG. 13 is a flowchart, illustrating a process 1300 for performing automated testing for an experience, in accordance with an embodiment. For clarity, FIGS. 12 and 13 will be discussed together. Using the techniques discussed below, new experience-based automation testing may be implemented and executed by a computer system.

The process 1300 begins by receiving (block 1302) an indication of processes associated with an experience to be tested. For example, in FIG. 12, an indication 1202 of an experience with five processes is provided to one or more automation test engines 1204, where automation tests ascribed to the one or more processes are retrieved (block 1304).

The automation tests are compiled (block 1306), resulting in sequential automation tests. Thus, automation tests for each process may flow to a next process in the experience. Arguments output from predecessor automation tests may be used as inputs for successor automation tests, enabling automation testing linking from process to process for the entire set of processes of the experience.

The compiled automation tests are then executed (block 1308). The results 1206 of the automation testing are stored/presented (block 1310) as an indication of a change impact. These change impact indications may provide an indication of the stability of the experience after a change is introduced.

As may be appreciated, the change management systems that are centered on customer and employee experiences provide significant benefits over traditional change management systems. For example, an increased level of ownership, at an experience level, may be observed. This may result in efficient change implementation, as teams can proactively move towards maturation of an experience. Further, impact analysis may be performed at the experience and/or process level, such that it is clear what experiences are impacted by a change. Thus, the experience-based change management systems and techniques provided herein improve existing computer technology, by introducing new change tracking and prioritization, by computers, while reducing human subjectivity.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory, computer-readable storage medium, comprising computer-readable instructions stored thereon which, when executed by one or more hardware processors, cause the one or more hardware processors to:
   source, from a variety of sources, feedback on a process that is part of a plurality of experiences, by:
   i. identifying, among a website or a mobile application that provide the process, a plurality of errors observed during execution of the process, and
   ii. monitoring communications between backend systems based upon an interpolation of real-world observed timings with minimum and optimal timing thresholds;
   identify, among links of code stored in code repositories, a particular code associated with an improvement of the sourced feedback;
   perform automated testing of the plurality of experiences, by:
   retrieving, at one or more automation test engines, automation tests ascribed to a subset of the plurality of experiences of the plurality of experiences,
   compiling the automation tests into sequential automation tests by inputting arguments outputted from predecessor automation tests as inputs for successor automation tests in a next process in the plurality of experiences and by generating subsequent links among all of the sequential automation tests,
   automatically opening and executing the compiled automation tests as scripts by an automation test script tool, and
   storing and presenting results of the automation tests indicating a change impact on stability of the plurality of experiences.

2. The, non-transitory, computer-readable medium of claim 1, comprising the computer-readable instructions that, when further executed by the one or more hardware processors, cause the computer to:
   display in a change impact graphical user interface (GUI), an affordance to select a particular process;
   receive a selection of the particular process via the affordance; and
   in response to receiving the selection, generate a request comprising the particular process.

3. The, non-transitory, computer-readable medium of claim 2, comprising the computer-readable instructions that, when further executed by the one or more hardware processors, cause the computer to:
   provide, in the change impact graphical user interface (GUI), an indication of processes associated with the subset of the plurality of experiences associated with the particular process.

4. The, non-transitory, computer-readable medium of claim 3, comprising the computer-readable instructions that, when further executed by the one or more hardware processors, cause the computer to:

provide, in the change impact graphical user interface (GUI), an indication of overlap of the processes associated with each of the subset of the plurality of experiences associated with the particular process.

5. The, non-transitory, computer-readable medium of claim 4, wherein the indication of overlap provides an indication of interdependencies between the plurality of experiences and underlying processes associated with the plurality of experiences.

6. The, non-transitory, computer-readable medium of claim 3, comprising the computer-readable instructions that, when further executed by the one or more hardware processors, cause the computer to:

receive an indication of a selection of one of the processes associated with the subset of the plurality of experiences associated with the particular process; and in response to receiving the indication of the selection of the one of the processes associated with the subset of the plurality of experiences associated with the particular process, provide a process-specific graphical user interface (GUI) that provides details of the one of the processes.

7. The, non-transitory, computer-readable medium of claim 2, comprising the computer-readable instructions that, when further executed by the one or more hardware processors, cause the computer to:

in response to receiving the request, provide via the change impact graphical user interface (GUI), a graphical response consisting of the subset of the plurality of experiences associated with the particular process.

8. A computer-implemented method, comprising:

sourcing, by one or more hardware processors, from a variety of sources, feedback on a process that is part of a plurality of experiences, by:
  i. identifying, by the one or more hardware processors, among a website or a mobile application that provide the process, a plurality of errors observed during execution of the process, and
  ii. monitoring, by the one or more hardware processors, communications between backend systems based upon an interpolation of real-world observed timings with minimum and optimal timing thresholds;

identifying, by the one or more hardware processors, among links of code stored in code repositories, a particular code associated with an improvement of the sourced feedback;

performing, by the one or more hardware processors, automated testing of the plurality of experiences, by:
  retrieving, by the one or more hardware processors, at one or more automation test engines, automation tests ascribed to a subset of the plurality of experiences of the plurality of experiences;
  compiling, by the one or more hardware processors, the automation tests into sequential automation tests by inputting arguments outputted from predecessor automation tests as inputs for successor automation tests in a next process in the plurality of experiences and by generating subsequent links among all of the sequential automation tests;
  automatically opening and executing, by the one or more hardware processors, the compiled automated tests as scripts by an automation test script tool; and storing and presenting, by the one or more hardware processors, results of the automation tests indicating a change impact on stability of the plurality of experiences.

9. The computer-implemented method of claim 8, further comprising:

displaying, by the one or more hardware processors, in a change impact graphical user interface (GUI), an affordance to select a particular process;

receiving a selection of the particular process via the affordance; and in response to receiving the selection, generating a request comprising the particular process.

10. The computer-implemented method of claim 9, further comprising:

providing, by the one or more hardware processors, in the change impact graphical user interface (GUI), an indication of processes associated with the subset of the plurality of experiences associated with the particular process.

11. The computer-implemented method of claim 10, further comprising:

providing, by the one or more hardware processors, in the change impact graphical user interface (GUI), an indication of overlap of the processes associated with each of the subset of the plurality of experiences associated with the particular process.

12. The computer-implemented method of claim 11, wherein the indication of overlap provides an indication of interdependencies between the plurality of experiences and underlying processes associated with the plurality of experiences.

13. The computer-implemented method of claim 10, further comprising:

receiving, by the one or more hardware processors, an indication of a selection of one of the processes associated with the subset of the plurality of experiences associated with the particular process; and in response to receiving the indication of the selection of the one of the processes associated with the subset of the plurality of experiences associated with the particular process, providing, by the one or more hardware processors, a process-specific graphical user interface (GUI) that provides details of the one of the processes.

14. The computer-implemented method of claim 9, further comprising:

in response to receiving the request, providing, via the change impact graphical user interface (GUI), a graphical response consisting of indications of the subset of the plurality of experiences associated with the particular process.

15. A system, comprising:

one or more hardware processors configured to:

source, from a variety of sources, feedback on a process that is part of a plurality of experiences, by:
  i. identifying, among a website or a mobile application that provide the process, a plurality of errors observed during execution of the process, and
  ii. monitoring communications between backend systems based upon an interpolation of real-world observed timings with minimum and optimal timing thresholds;

identify, among links of code stored in code repositories, a particular code associated with an improvement of the sourced feedback;

perform automated testing of the plurality of experiences, by:

retrieving, at one or more automation test engines, automation tests ascribed to a subset of the plurality of experiences of the plurality of experiences, compiling the automation tests into sequential automation tests by inputting arguments outputted from predecessor automation tests as inputs for successor automation tests in a next process in the plurality of experiences and by generating subsequent links among all of the sequential automation tests, automatically opening and executing the compiled automation tests as scripts by an automation test script tool, and storing and presenting results of the automation tests indicating a change impact on stability of the plurality of experiences.

16. The system of claim 15, wherein the one or more hardware processors are further configured to:

display in a change impact graphical user interface (GUI), an affordance to select a particular process;

receive a selection of the particular process via the affordance; and in response to receiving the selection, generate a request comprising the particular process.

17. The system of claim 16, wherein the one or more hardware processors are further configured to:

provide, in the change impact graphical user interface (GUI), an indication of processes associated with the subset of the plurality of experiences associated with the particular process.

18. The system of claim 17, wherein the one or more hardware processors are further configured to:

provide, in the change graphical user interface impact (GUI), an indication of overlap of the processes associated with each of the subset of the plurality of experiences associated with the particular process.

19. The system of claim 18, wherein the indication of overlap provides an indication of interdependencies between the plurality of experiences and underlying processes associated with the plurality of experiences.

20. The system of claim 17, wherein the one or more hardware processors are further configured to:

receive an indication of a selection of one of the processes associated with the subset of the plurality of experiences associated with the particular process; and in response to receiving the indication of the selection of the one of the processes associated with the subset of the plurality of experiences associated with the particular process, provide a process-specific graphical user interface (GUI) that provides details of the one of the processes.

* * * * *

UNITED STATES PATENT AND TRADEMARK OFFICE
CERTIFICATE OF CORRECTION

| | | |
|---|---|---|
| PATENT NO. | : 12,067,513 B1 | Page 1 of 1 |
| APPLICATION NO. | : 17/538780 | |
| DATED | : August 20, 2024 | |
| INVENTOR(S) | : Jones et al. | |

It is certified that error appears in the above-identified patent and that said Letters Patent is hereby corrected as shown below:

On the Title Page

1. In Item (71), under "Applicant", in Column 1, Line 2, delete "Assocation" and insert -- Association --, therefor.

In the Claims

2. In Column 14, Lines 34-35, in Claim 1, delete "of the plurality of experiences of the plurality of experiences," and insert -- of the plurality of experiences, --, therefor.

3. In Column 14, Line 48, in Claim 2, delete "The," and insert -- The --, therefor.

4. In Column 14, Line 58, in Claim 3, delete "The," and insert -- The --, therefor.

5. In Column 14, Line 66, in Claim 4, delete "The," and insert -- The --, therefor.

6. In Column 15, Line 7, in Claim 5, delete "The," and insert -- The --, therefor.

7. In Column 15, Line 13, in Claim 6, delete "The," and insert -- The --, therefor.

8. In Column 15, Line 26, in Claim 7, delete "The," and insert -- The --, therefor.

9. In Column 15, Lines 55-56, in Claim 8, delete "of the plurality of experiences of the plurality of experiences;" and insert -- of the plurality of experiences; --, therefor.

10. In Column 17, Lines 2-3, in Claim 15, delete "of the plurality of experiences of the plurality of experiences," and insert -- of the plurality of experiences, --, therefor.

Signed and Sealed this
Fourth Day of February, 2025

Coke Morgan Stewart
*Acting Director of the United States Patent and Trademark Office*